May 24, 1966 T. O. EDMOND ETAL 3,252,768
CONTROLLED TEMPERATURE AND PRESSURE VALVE
Filed Feb. 13, 1963

INVENTORS
TIBOR O. EDMOND,
JAMES O. THIEME &
BY RICHARD L. EVERY

ATTORNEY

United States Patent Office 3,252,768
Patented May 24, 1966

3,252,768
CONTROLLED TEMPERATURE AND PRESSURE VALVE
Tibor O. Edmond, James O. Thieme, and Richard L. Every, Ponca City, Okla., assignors to Continental Oil Company, Ponca City, Okla., a corporation of Oklahoma
Filed Feb. 13, 1963, Ser. No. 258,238
5 Claims. (Cl. 23—292)

This invention relates to an apparatus for introducing a first non-gaseous material to a second non-gaseous material. More specifically, but not by way of limitation, the invention relates to apparatus which may be employed for thermally and barometrically adjusting a sample of non-gaseous material and its gaseous environment prior to the addition of such sample to a second non-gaseous sample.

It is frequently highly desirable to add or introduce a solid material or liquid material to a second solid or liquid material in such a way that the addition of the first material to the second does not upset or cause a variation in the vapor phase over the second material. It is also often necessary, when it is desired to observe the interaction between two materials, to thermally equilibrate the materials at a given predetermined temperature. Yet another requirement is sometimes encountered in the addition of one non-gaseous sample to another. This is that one or both of the samples require the protection or blanketing environment of a special atmosphere, such as a suitable inert gas. On occasion, all of the above requirements may apply in order to perform the addition of one type of non-gaseous material to another so that certain phenomena may be observed and certain data obtained. In such event, it has previously been necessary to employ rather sophisticated heat exchange devices for thermally adjusting the samples, manometers or pressure gauges and pumps for barometrically equilibrating the samples, and other relatively expensive equipment.

The present invention provides a novel and highly useful apparatus which may be used to instantaneously and completely admit or introduce the first sample of non-gaseous material to a second sample of non-gaseous material after the first sample has been thermally and barometrically adjusted to a desired temperature and pressure. The thermal and barometric adjustment of the first sample may be easily and rapidly accomplished with a minimum number of physical manipulations by an operator.

Broadly, the present invention comprises a first tubular member which is provided with a sample inlet opening and a sample discharge opening each extending through the peripheral wall thereof, which openings are circumferentially spaced from each other around the periphery of the first tubular member; a second tubular member telescoped coaxially into said first tubular member for rotation therein and having its peripheral walls sealingly engaging the walls of said first tubular member; a sample holding chamber extending radially inwardly into the second tubular member through the peripheral wall thereof in substantially coplanar alignment with the openings in the peripheral wall of said first tubular member and having its end at the wall of said second tubular member open and positioned for registration with said openings in said first tubular member when said second tubular member is rotated in said first tubular member; and a sample discharge means secured to the peripheral wall of said first tubular member in registry with the sample discharge opening therethrough.

In the operation of the device as thus broadly described, the second tubular member is first rotated to bring the sample holding chamber which is secured thereto for rotation therewith into registration with the sample inlet opening in the peripheral wall of the first tubular member. A sample of a first non-gaseous material is then passed through the opening in the peripheral wall of the first tubular member into the sample holding chamber. After the sample has been deposited in the sample holding chamber, the second tubular member is rotated inside of the first tubular member to a position such as that the open end of the sample holding chamber is sealed by the peripheral wall of the first tubular member. A liquid or gaseous heat exchange medium is then passed through the second tubular member, and by contact with the walls of the sample holding chamber, will adjust the temperature of the sample therein to the temperature of the heat exchange medium. Such heat exchange medium may be circulated through the second tubular member from a constant temperature bath or other suitable source and, in a preferred embodiment of the invention, the apparatus of the invention is provided with a chamber through which the heat exchange medium is circulated and which is adapted to contain a temperature sensitive device, such as a thermometer or thermocouple. It will be appreciated that, in this way, the sample which is contained in the sample holding chamber may be brought to any desired temperature prior to its addition to a second solid or liquid material in the manner hereinafter described.

After thermal equilibration of the sample by heat exchange with a constant temperature heat exchange medium passed through the second tubular member, the second tubular member is further rotated to bring the sample holding chamber into registration with the sample discharge opening in the peripheral wall of the first tubular member. This opening is in registration with the sample discharge means. In a preferred embodiment of the invention, the sample discharge means comprises a neck which is secured to the first tubular member and extends radially outwardly from the peripheral wall thereof and is adapted for connection to a flask or other container which holds the second non-gaseous material. When the sample holding chamber is aligned, or in registry, with the sample discharge opening through the first tubular member, the sample of the first non-gaseous material is permitted to gravitate from the sample holding chamber and pass through the sample discharge means into a container or vessel in which the second non-gaseous material is located.

It will be perceived that, by the present invention, an apparatus is provided which may be utilized to easily and quickly transfer a non-gaseous sample which has been thermally equilibrated to any desired temperature to a second non-gaseous sample without opportunity existing for the thermally equilibrated first material to be subjected to ambient air currents or other influences which would tend to cause a departure of the sample from its state of thermal equilibration.

As a further and additional feature of the invention which is provided in a preferred embodiment of the apparatus, but which is not essential to the functioning of the apparatus as hereinbefore described, a pressure equalizing tube or conduit is connected between the sample discharge means and the peripheral wall of the first tubular member at a point between the sample inlet and sample discharge openings therethrough. Then, as the second tubular member is rotated within the first tubular member, the sample holding chamber may be brought into registration with one end of the pressure equalizing tube and the pressure over the sample made to conform to that which exists in the sample discharge means. Thus, when the sample discharge means comprises a discharge neck or tube which is sealingly connected to a flask or other container in which the second non-gaseous material is located, the pressure over the first sample contained within the sample holding chamber may be equalized with the pressure over the second sample contained in such flask or container. Once such pressure equilization is accomplished by aligning the open end of the sample holding chamber with the end of the pressure equalizing tube which is connected to the first tubular member, the second tubular member may then be further rotated to seal the open end of the sample holding chamber against the peripheral wall of the first tubular member and thereby preserve the pressure level over the sample of first material until such time as the material is discharged through the sample discharge neck secured to the peripheral wall of the first tubular member.

In a preferred embodiment of the invention, yet another important feature which is provided comprises a side or branch arm which branches off the pressure equalizing tube or conduit and which is placed in communication therewith through a three-way valve so that, if it is desired to introduce an inert gas or other special gaseous medium to the sample holding chamber, or to the flask or chamber containing the second non-gaseous material, or to both, this may be accomplished by setting the valve to permit gas to be introduced to both samples via the branch conduit and the pressure equalizing conduit. Alternatively, if it should be desired to alter the pressure over the sample of the first non-gaseous material contained within the sample holding chamber, this may be accomplished by proper adjustment of the three-way valve and connection to the branch conduit of a vacuum pump, source of compressed air or other pressure altering device.

From the foregoing description of the invention, it is believed that it will have become apparent that a major object of the present invention is to provide a novel, highly useful apparatus for facilitating the introduction or addition of a first non-gaseous material to a second non-gaseous material.

Another object of the invention is to provide a relatively inexpensive, easily constructed apparatus for quickly and efficiently adding a first sample of non-gaseous material to a second sample of such material after the first sample has been adjusted to any desired temperature or pressure.

An additional object of the present invention is to provide apparatus for isobarically admitting a thermally equilibrated sample of non-gaseous material to a second non-gaseous material with a minimum of physical manipulation of the apparatus being required.

More specific objects of the present invention include:

(a) To provide apparatus for efficiently and accurately adjusting and measuring the temperature of a first non-gaseous sample prior to its instantaneous addition at such temperature to a second non-gaseous sample;

(b) To provide apparatus for permitting a first non-gaseous sample to be placed under subatmospheric or superatmospheric pressure of substantially any magnitude desired prior to its instantaneous addition to a second sample of non-gaseous material;

(c) To provide apparatus for permitting a sample of a first non-gaseous material to be blanketed with a gaseous atmosphere of substantially any desired character prior to its addition to another sample of a second non-gaseous material;

(d) To provide apparatus for permitting both a sample of a first non-gaseous material which is to be added to a sample of a second non-gaseous material, and also the second non-gaseous material, to be simultaneously blanketed with a gaseous atmosphere of desired properties immediately prior to the instantaneous addition of the first material to the second material.

It is yet an additional object of the present invention to provide a compact, inexpensive and easily constructed apparatus which is capable of achieving all of the above objects and which may be operated with a minimum of technical skill and physical exertion.

Other objects and advantages of the present invention, in addition to those which have been hereinbefore described, will become apparent as the following detailed description of the invention is read in conjunction with a perusual of the accompanying drawings which illustrate our invention.

In the drawings:

FIGURE 1 is a vertical sectional view through the center of one embodiment of the apparatus of the present invention, as the apparatus appears when it is connected to a flask containing a non-gaseous material to which a second non-gaseous material is to be added through the instrumentality of the invention. The flask is illustrated in elevation with a portion of the neck of the flask broken away to more clearly illustrate the ground glass connection between the flask and one embodiment of the present invention.

Figure 1:
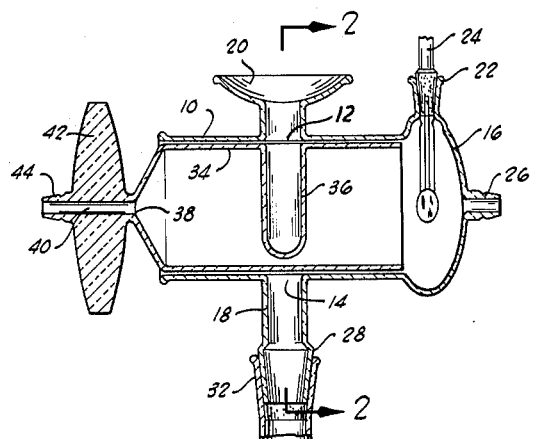

Referring now to the drawings in detail, and particularly to FIGURE 1, a first tubular member 10 is provided with a pair of openings 12 and 14 in the peripheral wall thereof for the purpose of admitting and discharging, respectively, a sample of a first non-gaseous material. In a preferred embodiment of the invention, the first tubular member 10 is constructed of glass and has formed integrally therewith a hollow, generally ellipsoid temperature measuring chamber 16, a sample discharge neck 18 and a sample receiving or admitting funnel 20. The temperature measuring chamber 16 has formed at its upper side (its side positioned adjacent the funnel 20) a thermometer well 22 which is preferably constructed of ground glass and is dimensioned to receive a thermometer 24 of the type illustrated. The temperature measuring chamber 16 is also provided with a fluted discharge nipple 26 to facilitate the connection thereto of suitable flexible tubing (not shown) which may be connected at its other end to a constant temperature bath for a purpose hereinafter more fully described.

In a preferred embodiment of the invention, the discharge neck 18 is, as has been indicated, formed integrally with the first tubular member 10 and is positioned on the peripheral wall of the first tubular member 10 in registry with the sample discharge opening 14 therethrough. The discharge neck 18 is provided at its free end with a tapered ground glass surface 28 which permits it to be sealingly connected to a flask 30 having a ground glass mouth 32, or to any other container which is provided with a suitable ground glass connecting member.

A second tubular member designated by reference character 34 is coaxially telescoped into the first tubular member 10 and is of a diameter such that its peripheral wall sealingly engages the peripheral wall of the first tubular member 10. In a preferred embodiment of the invention, the seal between the wall of the second tubular member 34 and the first tubular member 10 is enhanced through the use of a stopcock grease or other suitable sealant (not shown) in a manner well known in the art. At a position approximately midway of the length of the second tubular member 34 and positioned in substantially coplanar alignment with the openings 12 and 14 in the first tubular member 10 is a sample holding chamber 36 which extends radially inwardly from the peripheral wall of the second tubular member 34. The sample holding chamber 36 preferably extends substantially the entire distance across the second tubular member 34 and is open at one of its ends adjacent the peripheral wall of the second tubular member 34 so that it may be placed in communication with the openings 12 and 14 through the first tubular member 10 when the second tubular member 34 is rotated therein.

At its end opposite that end which is in juxtaposition to the temperature measuring chamber 16, the second tubular member 34 is necked down to a neck portion 38 of relatively small outside diameter. A small bore 40 passes through the neck portion 38 and through a generally ellipsoidal handle 42 which, in a preferred embodiment of the invention, is constructed of glass and molded integrally with the second tubular member 34. A fluted nipple 44 is formed integrally with the handle 42 with the bore 40 extending therethrough to facilitate the connection of a flexible conduit thereto for a purpose hereinafter more fully described.

Figure 2:
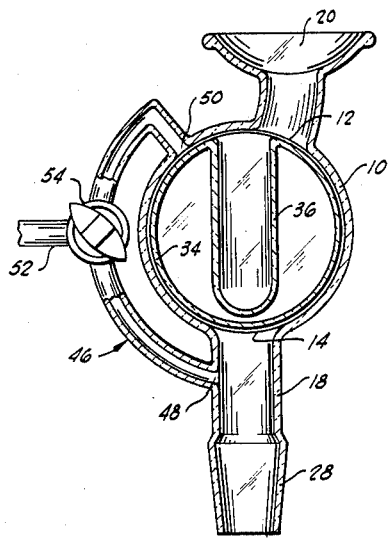
FIGURE 2 is a view in section taken along lines 2–2 of FIGURE 1.
Figure 3:
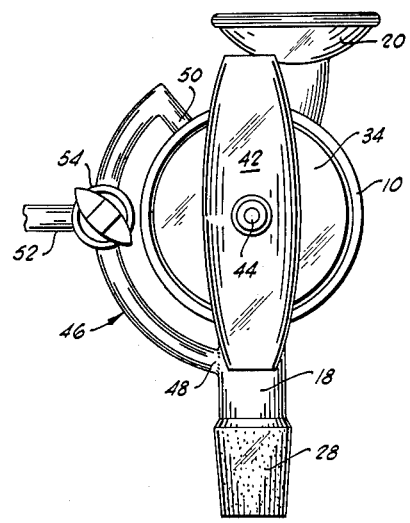
FIGURE 3 is a view in elevation of the present invention as it appears when viewed from the end of the apparatus at which the handle for manipulating the apparatus is located.

In order to provide for the equalization of pressure between the sample discharge neck 18, the flask 30 and the sample holding chamber 36, a pressure equalizing tube or conduit 46 is provided and is most clearly illustrated in FIGURES 2 and 3. The pressure equalizing conduit 46 comprises a small arcuate tubular member which is connected at one of its ends to the sample discharge neck 18 and at its other end 50 to the first tubular member 10 at a point on the peripheral wall thereof between the sample inlet opening 12 and the sample discharge opening 14. The end 50 of the pressure equalizing conduit 46 should be spaced from the sample inlet opening 12 on the tubular member 10 by a distance which is greater than the size of the opening into the sample holding chamber 36. In this way, the sample holding chamber 36 cannot be simultaneously placed in communication with the sample inlet opening 12 and the pressure equalizing conduit 46.

As a final element of a preferred embodiment of the invention, there is provided a branch conduit 52 which branches from the pressure equalizing conduit 46 between the ends 48 and 50 thereof and is placed in communication with the pressure equalizing conduit 46 through a suitable three-way valve 54. The three-way valve 54 may be manipulated to place the branch conduit 52 in communication with the upper portion of the pressure equalizing conduit 46 and the upper end 50 thereof, or alternately, in communication with the lower portion of the pressure equalizing conduit 46 and the opening 48 at the lower end thereof, or to isolate the branch conduit 52 entirely from the pressure equalizing conduit 46 or, as a final alternative, to place the branch conduit 52 in communication with both the upper and lower portions of the pressure equalizing conduit 46.

*Operation*

Having described the various elements of the present invention and their orientation relative to each other, the operation of the invention will next be considered. A broad, major object of the invention has been indicated to be that of permitting a first non-gaseous sample to be introduced or added to a second non-gaseous sample after the first sample has been thermally and/or barometrically adjusted in a desired manner. In order to accomplish such sample addition with the apparatus of the present invention, the non-gaseous sample to which a second non-gaseous sample is to be added is initially placed in a suitable container, such as the flask 30 shown in FIGURE 1. The non-gaseous sample may, of course, be either a liquid or solid sample.

The container in which one of the non-gaseous samples is thus located in then sealingly connected to the discharge neck 18 so that a sample may be passed through the discharge neck into the flask or container. The provision of ground glass joints of the type illustrated in FIGURE 1 for the purpose of providing a seal of the type described is well understood by those skilled in the art and constitutes a preferred method of utilizing the apparatus of this invention. Regardless, however, of the manner in which a seal is established between the discharge neck 18 and the opening into the container which holds one of the non-gaseous samples, it is necessary to the use of the apparatus of the invention to position the first tubular member 10 so that the discharge neck 18 is at the lower side thereof and the sample inlet opening 12 and the funnel 20 are at the upper side thereof.

With the apparatus thus oriented, the second tubular member 34 is next rotated within the first tubular member 10 through the instrumentality of the handle 42 until the open end of the sample holding chamber 36 is brought into registration with the sample inlet opening 12. Next, the nipples 44 and 26 are connected to sections of suitable flexible tubing (not shown) which are also connected at their other ends to a constant temperature bath or other source of a liquid or gaseous heat exchange medium. A suitable pump (not shown) is provided for circulating the heat exchange medium through the bore 40, the second tubular member 34, the temperature measuring chamber 16 and out through the nipple 26. Circulation of the heat exchange medium through the second tubular member 34 should be continued until the temperature of the circulating medium becomes stabilized as indicated by the thermometer 24 which is positioned in the temperature measuring chamber 16. The temperature of the heat exchange medium which is circulated through the second tubular member 34 will be adjusted to the temperature to which it is desired to bring a sample contained within the sample holding chamber 36 prior to the admission of such sample to the flask 30 where it is combined with the second non-gaseous material.

After the temperature of the heat exchange medium which is circulated through the second tubular member 34 has been adjusted to the desired level, the non-gaseous material which it is desired to add to the non-gaseous material in the flask 30 is introduced to the sample holding chamber 36 via the funnel 20 and the sample inlet opening 12. Free passage of such material into the sample holding chamber 36 is facilitated by reason of the alignment or registration of the open end of the sample holding chamber 36 with the sample inlet opening 12. When the sample has been deposited in the sample holding chamber 36, the handle 42 is turned to rotate the second tubular member 34 in the first tubular member 10 by an amount sufficient to align the open end of the sample holding chamber 36 with the upper end 50 of the pressure equalizing conduit 46. If, at this time, the three-way valve 54 has been adjusted to isolate the branch conduit 52 and to place the upper and lower portions of the pressure equalizing conduit 46 in communication with each other, the pressure over the non-gaseous material contained in the sample holding chamber 36 and the pressure over the second non-gaseous material contained in the flask 30 will be equalized.

After permitting the sample holding chamber 36 to remain in communication with the open upper end 50 of the pressure equalizing conduit 46 for a sufficient period of time for the sample contained in the chamber to become isobarically equilibrated at the desired temperature, the handle 42 is further manipulated to rotate the second tubular member 34 until the open end of the sample holding chamber 36 is brought into registry with the sample discharge opening 14 in the peripheral wall of the first tubular member 10. At the instant that such registration is established, the sample contained in the sample holding chamber 36 will gravitate therefrom through the sample discharge neck 18 and into the flask 30. The sample from the sample holding chamber 36 is thus instantaneously and completely added to the material in the flask 30 after having been adjusted to any desired temperature and substantially the same pressure as that which appertains in the flask 30.

Several alternatives exist to operation in the manner described. For example, it may, in some instances, be desirable to blanket both the materials contained within the sample holding chamber 36 and in the flask 30 with an inert gas prior to the combining of such materials. In this eventuality, during the time the open end of the sample holding chamber 36 is in communication with the pressure equalizing conduit 46, the three-way valve 54 may be manipulated to place both the flask 30 and the sample holding chamber 36 in communication with the branch conduit 52. The branch conduit 52 may then be connected to suitable evacuating instrument, such as a vacuum pump, and both the sample holding chamber 36 and the flask 30 exacuated. Next, a source of a suitable inert gas, such as nitrogen or helium, may be connected to the branch conduit 52 and such gas introduced to both the sample holding chamber 36 and the flask 30.

It will also be apparent that, if it should be desired to selectively blanket with an inert atmosphere either the sample contained within the sample holding chamber 36 or the sample contained within the flask 30, these operations may be performed by proper utilization of the branch conduit 52 and the three-way valve 54.

As yet another alternative use of the apparatus of the present invention, the apparatus may be utilized for measuring an increase in vapor pressure or the generation of a gas upon addition of the first material from the sample holding chamber 36 to the second material contained within the flask 30. In order to measure such fluctuations in pressure, the pressure over the sample contained within the sample holding chamber 36 is first equilibrated or equalized with the pressure obtaining over the sample contained within the flask 30 in the manner hereinbefore described. The sample holding chamber 36 is then rotated out of communication with the pressure equalizing conduit 46 and the three-way valve 54 is manipulated to place the flask 30 in communication with a suitable pressure measuring device, such as a manometer or the like. The second tubular member 34 is then further rotated to bring the sample holding chamber 36 into registration with the sample discharge neck 18 and permit the contents of the chamber to gravitate into the flask 30. At the instant that the sample within the flask 30 is commingled or mixed with the sample from the sample holding chamber 36, any changes in the vapor pressure over the mixture will be registered by the pressure measuring instrument connected to the branch conduit 52.

From the foregoing description of the invention, it will be apparent that the described apparatus has a great many applications and uses which have been hereinbefore described merely in general terms. As a more specific example of one such application of the apparatus, the apparatus may be utilized to determine the specific heat of solids in the range of cryogenic temperature. This is normally done, as is well known, by measuring the amount of a liquified gas which is evaporated by the addition of the solid sample to such liquified gas. Utilizing the present invention, the liquified gas is placed in the flask 30 and a measure of the rate of evaporation from the liquified gas as a result of heat transfer through the walls of the flask is first obtained by connecting a suitable measuring instrument to the branch arm 52 of the apparatus. The solid sample is then placed in the sample containing chamber 36 and brought to the desired cryogenic temperature. The vapor pressure over the solid sample is next brought to the prevailing pressure in the flask containing the liquified gas. Finally, the heated solid is instantaneously added to the liquid media in the manner hereinbefore prescribed and the amount of the liquified gas which is evaporated as a result of such addition is measured by the measuring instrument connected to the branch conduit 52.

Although certain details of construction which are usefully employed in a preferred embodiment of the invention have been hereinbefore described by way of example, it is apparent that a number of changes and innovations may be made in the prescribed apparatus without departure from the basic principles underlying the invention. Insofar as such changes and modifications continue to rely upon the novel concepts and basic principles hereinbefore disclosed, such changes and modifications are deemed to be circumscribed by the spirit and scope of the invention except as the same may be necessarily limited by the appended claims.

We claim:

1. Apparatus for introducing first material to second material comprising:
   (a) a first tubular member having an inlet and discharge opening passing through the wall thereof, said inlet being circumferentially spaced on said wall from said discharge opening;
   (b) a second tubular member rotatably seated within said first tubular member and sealingly engaging at its outer periphery the inner periphery of said first tubular member;
   (c) a pressure equalizing conduit communicating at one of its ends with said discharge opening and at its other end with the interior of said first tubular member at a point on the wall thereof between said inlet and said discharge opening;
   (d) a branch conduit connected to said pressure equalizing conduit between the ends thereof;
   (e) a valve at the junction of said branch conduit and said pressure equalizing conduit for placing the ends of said pressure equalizing conduit into and out of communication with said branch conduit; and
   (f) a sample chamber carried by said second tubular member and positioned thereon to index succesively with said inlet, said pressure equalizing conduit and said discharge opening when said second tubular member is rotated in said first tubular member.

2. The apparatus defined in claim 1 further characterized in that one end of said first tubular member is restricted to form a fluid passageway and the opposite end of said second tubular member is restricted to form a fluid passageway whereby a fluid chamber is formed surrounding the exterior of said sample chamber.

3. Apparatus as claimed in claim 2 and further characterized to include:
   (a) a temperature measurement chamber connected to one end of said first tubular member and positioned for receiving fluid flowing through said second tubular member and around said radially inwardly extending indentation; and
   (b) temperature sensing means projecting into said temperature measurement chamber for contact with the fluid therein.

4. A system for isobarically combining two non-gaseous materials comprising, in combination:
   (a) a flask for containing one of said materials;
   (b) a generally T-shaped tubular member including an open-ended tubular cross member and an open-ended tubular branch member radially extending from a medial portion of said cross member and sealingly connected at its free end to said flask, said tubular cross member having a sample inlet opening through the peripheral wall thereof spaced circumferentially from said branch member;
   (c) a fluid conveying, open-ended cylindrical sleeve slidingly and rotatably positioned concentrically within said tubular cross member and having a sample receiving indentation therein projecting radially inwardly from the peripheral wall thereof and positioned for successive registrations with said sample inlet opening and said tubular branch member when said cylindrical sleeve is rotated in said tubular cross member; and
   (d) a pressure equalizing tube connected between said tubular branch member and said tubular cross member at a point thereon between said sample inlet opening and said tubular branch member whereby the pressure in said sample receiving indentation may be equalized with the pressure in said flask by rotating said cylindrical sleeve in said tubular cross member to bring said indentation into registration with said pressure equalizing tube; and
(e) means, associated with said tubular member and said cylindrical sleeve for passing heat exchange fluid into and out of contact with said sample receiving indentation.

5. A system as claimed in claim 4 wherein said tubular branch member is sealingly connected to said flask through a ground glass joint.

References Cited by the Examiner

FOREIGN PATENTS

| 1,128,181 | 4/1962 | Germany. |
| 326,610 | 2/1958 | Switzerland. |

MORRIS O. WOLK, *Primary Examiner.*

JAMES H. TAYMAN, Jr., *Examiner.*